(12) United States Patent
Kimura et al.

(10) Patent No.: US 6,678,041 B2
(45) Date of Patent: Jan. 13, 2004

(54) OPTICAL CHARACTERISTIC MEASURING APPARATUS, THE METHOD THEREOF AND RECORDING MEDIUM

(75) Inventors: Eiji Kimura, Saitama (JP); Motoki Imamura, Saitama (JP); Fumio Inui, Saitama (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/870,723

(22) Filed: Jun. 1, 2001

(65) Prior Publication Data

US 2002/0003621 A1 Jan. 10, 2002

(30) Foreign Application Priority Data

Jul. 10, 2000 (JP) ...................... P2000-208220

(51) Int. Cl.[7] ............................................... G01N 21/00
(52) U.S. Cl. ....................................................... 356/73.1
(58) Field of Search .............................. 356/73.1, 218, 356/239.2, 434, 226; 359/154, 173, 181; 375/147, 346, 143, 353, 333, 232, 240; 360/65, 46, 68, 31, 25

(56) References Cited

U.S. PATENT DOCUMENTS 5,530,583 A * 6/1996 Uno et al. .................. 359/337
5,907,420 A * 5/1999 Chraplyvy et al. ......... 359/124
6,269,134 B1 * 7/2001 Yoon et al. ................. 332/115

FOREIGN PATENT DOCUMENTS

| DE | 692 01 244 T2 | 5/1995 |
| DE | 44 11 063 A1 | 10/1995 |
| EP | 0812075 | 5/1997 |
| EP | 0 908 715 A2 | 4/1999 |
| EP | 0987583 | 8/1999 |
| JP | 70336300 | 12/1995 |
| WO | WO 98/57138 | 12/1998 |

* cited by examiner

Primary Examiner—Tu T. Nguyen
(74) Attorney, Agent, or Firm—Lowe Hauptman Gilman & Berner LLP (57) ABSTRACT

An apparatus capable of reducing a waveform distortion of outgoing light when light of an optical wavelength in a certain specific narrow range is incident upon optical fiber comprises optical source 10 for supplying the incident light to optical fiber line 110, waveform monitor 42 for measuring a waveform distortion of the transmitted light and adjusting unit 44 for adjusting an output of the incident light so that the measured waveform distortion falls within a predetermined range. By adjusting the output of the incident light, a S/N ration is lowered. Since the noise exists within a relatively wide range of wavelength, the rang of wavelength of the incident light is widened. Therefore, it is possible to reduce the waveform distortion of the outgoing light.

9 Claims, 9 Drawing Sheets

OPTICAL CHARACTERISTIC MEASURING APPARATUS, THE METHOD THEREOF AND RECORDING MEDIUM

BACKGROUND OF THE INVENTION

1. Field of Invention

The present invention relates to an apparatus for measuring a wavelength dispersion characteristic of DUT (Device Under Test) such as a combination of an optical fiber and an optical amplifier.

2. Description of the Related Art

It may cause a great loss of light when light is transferred to a long distance only through an optical fiber. Therefore, the loss is prevented by using an optical fiber line combined with an optical amplifier (EDFA) which amplifies an optical signal therein. The optical amplifier passes light to a unilateral direction. The optical fiber line means a combination of an optical fiber and an optical amplifier.

Figure 7:
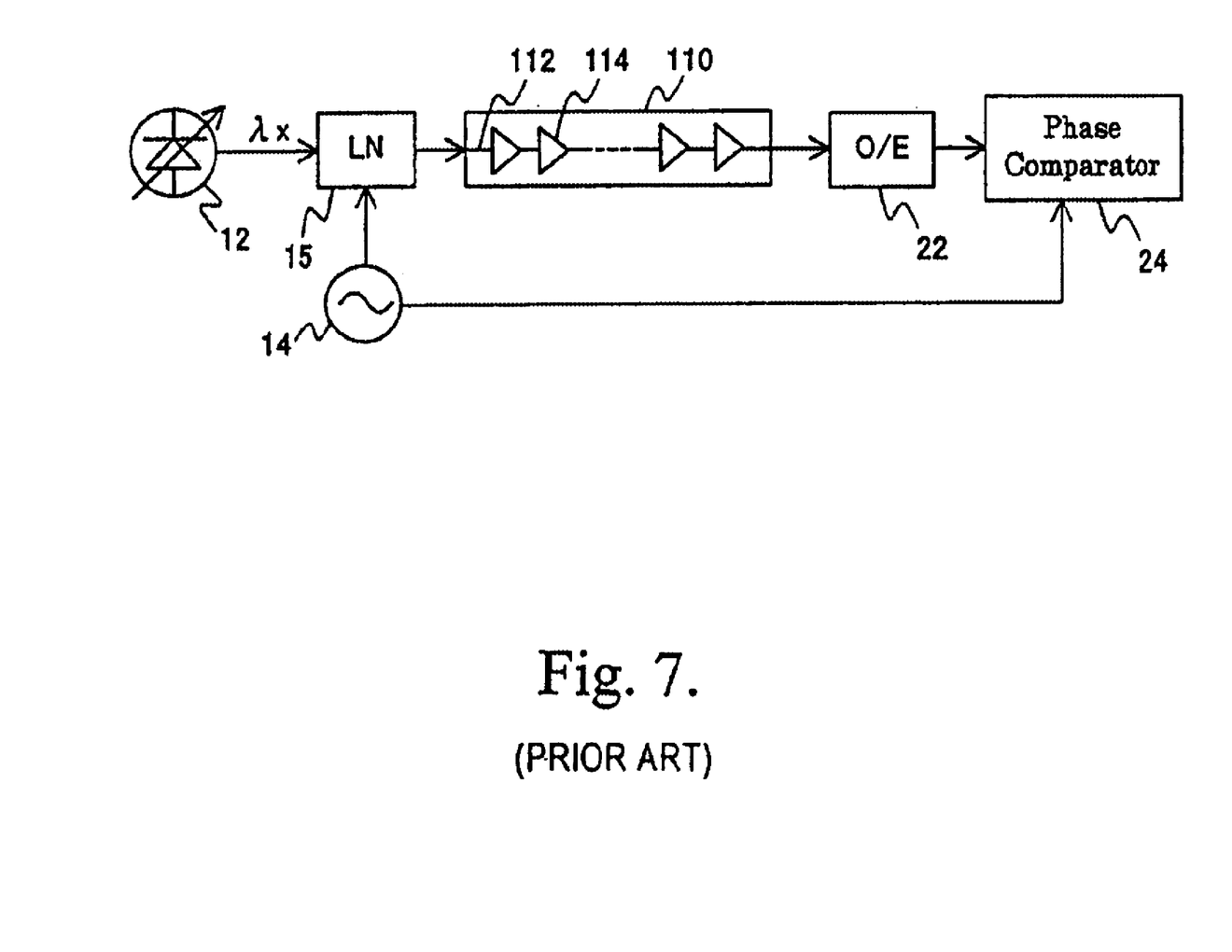
FIG. 7 is a block diagram showing a construction of a conventional measuring system for measuring a wavelength dispersion characteristic of an optical fiber line.

FIG. 7 shows a construction of a measuring system for measuring a wavelength dispersion characteristic of an optical fiber line. An optical fiber line 110 is formed by a combination of an optical fiber 112 and an optical amplifier 114. The optical fiber line 110 passes light into a right direction. A variable wavelength light source 12 generates light by changing a wavelength. The light is modulated to a frequency of a power supply for modulation 14 by an optical modulator 15, and then is incident upon the optical fiber line 110. The light transmitting the optical fiber line 110 is converted into an electric signal by photoelectric converter 22, and a phase thereof is compared with that of an electric signal generated from the power supply for modulation 14 by a phase comparator 24. That is, a phase difference is calculated. It is possible to obtain a group delay or a wavelength dispersion of the optical fiber line 110 from the phase difference.

In addition, generally, light with the condition of WDM (wavelength division multiplying) is inputted into the optical fiber line 110. On the premise of this, the optical fiber line 110 is designed to maintain a quality of transferred waveform of the optical fiber line 110 by incidence of light, such as 16 waves and 40 waves and the like, which has a wavelength magnification in accordance with a design upon the optical fiber line 110. Therefore, each optical amplifier 114 sets an automatic gain feedback to maintain a fixed level of an outgoing light.

SUMMARY OF INVENTION

Figure 8:
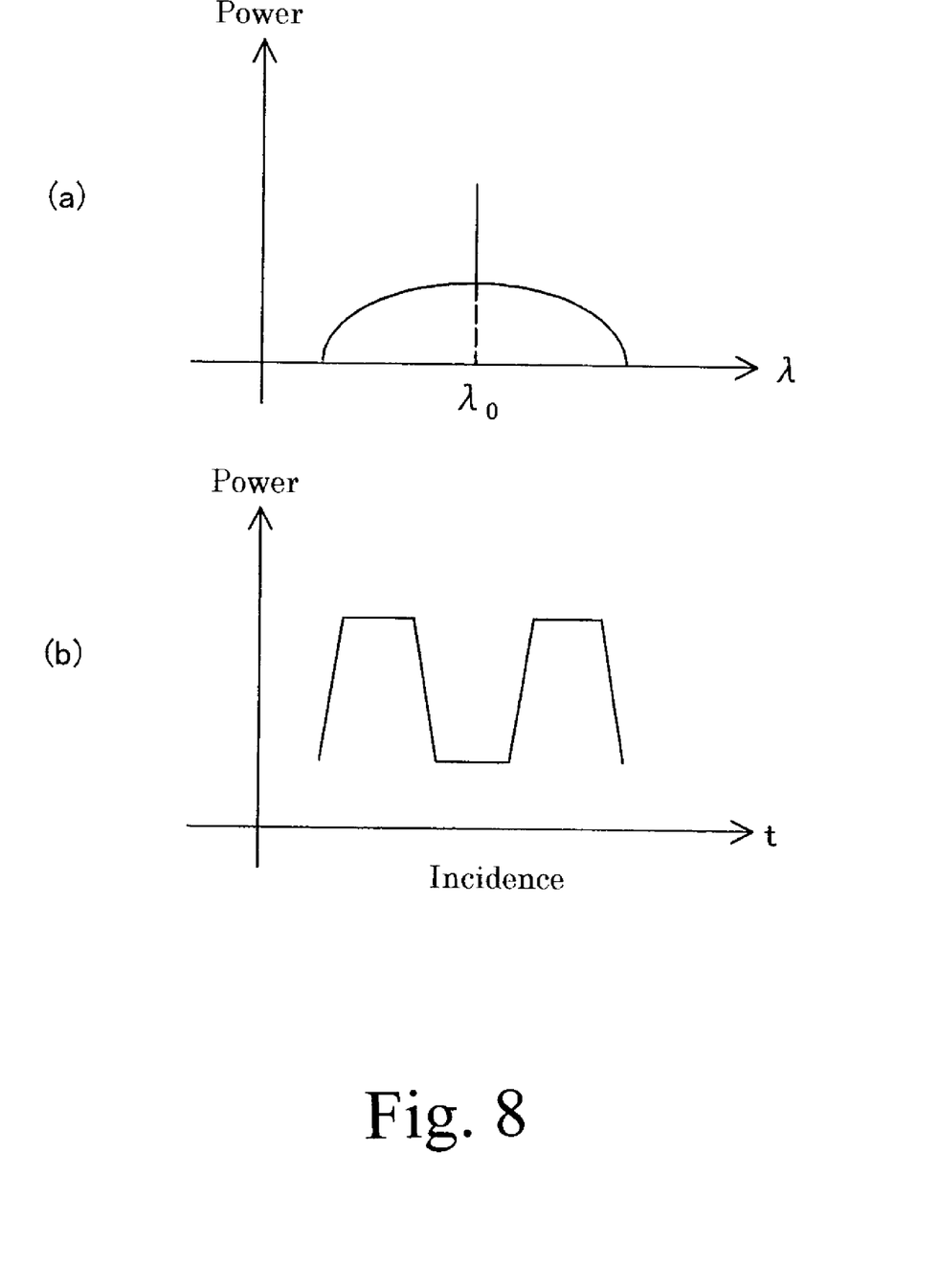
FIG. 8 is a waveform diagram of an incident light showing a case that an optical wavelength in a certain specific narrow range is incident upon an optical fiber line 110.

At this point, as shown in FIG. 8, there is a case that an optical wavelength in a certain specific narrow range is incident upon the optical fiber line 110. FIG. 8(a) shows a relationship between wavelength λ and power P, and FIG. 8(b) shows a relationship between time t and the power P. As shown in FIG. 8(a), the power is increased at a certain wavelength λ0. In this case, as shown in FIG. 8(b), there is no distortion in a waveform.

Figure 9:
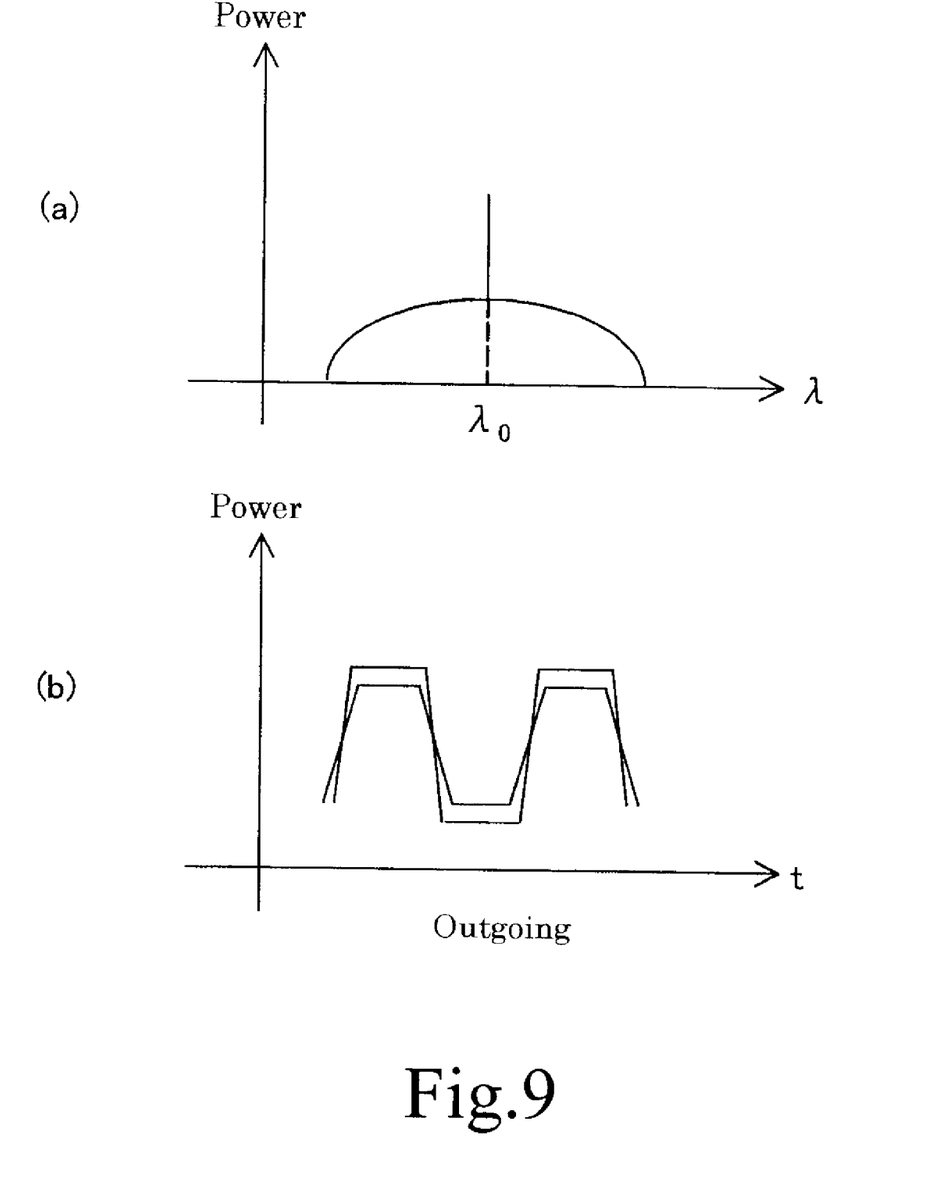
FIG. 9 is a waveform diagram of an outgoing light showing a case that an optical wavelength in a certain specific narrow range is incident upon an optical fiber line 110.

FIG. 9 shows an outgoing light in case that the light of an optical wavelength in a certain specific narrow range is incident upon the optical fiber line 110. FIG. 9(a) shows a relationship between wavelength λ and power P, and FIG. 9(b) shows a relationship between time t and power P. As shown in FIG. 9(b), a distortion occurs in an output waveform. That means a time jitter of signal. This is derived from the following reasons.

That is, when the optical wavelength in certain specified narrow range is incident upon the optical fiber line 110, an amplifier gain of the optical fiber line 110 is changed over a range estimated at the time of designing. Accordingly, the light of a certain wavelength λ0 is propagated with a strong power that is over the level estimated at the time of designing. When the powerful light is propagated the optical fiber line 110, the optical fiber line 110 is put into a non-linear region. Due to the non-linearity of the optical fiber line 110, an index of refraction of the optical fiber line 110 is varied with the lapse of time according to the optical power, the distortion of the output waveform is caused.

As the output waveform is distorted, an error is caused when detecting a phase difference from the phase comparator 24. Accordingly, the group delay or the wavelength dispersion of the optical fiber line 110 which are obtained from the phase difference may generate the error.

Moreover, it may be possible to minimize the distortion of the output waveform by adjusting a gain characteristic of the optical fiber line 110, however, it is difficult to adjust the gain characteristic.

Therefore, it is an object of the present invention to provide an apparatus for reducing a waveform distortion of an outgoing light in case that light of an optical wavelength in a certain specific narrow range is incident upon DUT.

In an optical characteristic measuring apparatus so constructed when incident light of a wavelength in a narrow range is supplied to the light transmitting objective, a distortion in the waveform of a transmitted light is caused. However, by adjusting the output of the incident light, a SIN ratio (signal to noise ratio) is lowered. The noise is of a relatively wide range of wavelength. Accordingly, if the S/N ratio is lowered properly, the incident light of a wavelength in the relatively wide range can be supplied to the objective. Therefore, it is possible to reduce a waveform distortion of the outgoing light.

In addition, there is an optical fiber, or a combination of an optical fiber and an optical amplifier for use as the light transmitting objective.

In accordance with the present invention, the incident light supplying unit includes a variable wavelength light source for generating light of a variable wavelength, and the optical output adjusting unit adjusts an output of the variable wavelength light source.

In accordance with an aspect of the present invention, the incident light supplying unit includes an optical modulating unit for modulating a light, and the optical output adjusting unit adjusts an amplitude of an output of the optical modulating unit.

In accordance with an aspect of the present invention, the incident light supplying unit includes an optical attenuating unit for attenuating the light, and the optical output adjusting unit adjusts an attenuating ratio of the optical attenuating unit.

According to the present invention an optical characteristic measuring apparatus for measuring a characteristic of a light transmitting objective includes: an incident light supplying unit for supplying incident light to the objective a waveform distortion measuring unit for measuring a waveform distortion of the light transmitted from the objective; a multi-wavelength light adding unit for adding multi-wavelength light of a plurality of wavelengths to the incident light; and a multi-wavelength light adjusting unit for adjusting an output of the multi-wavelength light so that the waveform distortion measured by the waveform distortion measuring unit falls within a predetermined range.

Further, in an optical characteristic measuring apparatus so constructed, when incident light of a wavelength in a narrow range is supplied to the objective, a distortion in a waveform of the transmitted light is caused. However, by adjusting the output of the multi-wavelength light of the plurality of wavelengths, being added to the incident light, the incident light of a wavelength in a wide range can be supplied to the objective. Therefore, it is possible to reduce the waveform distortion of the outgoing light.

In accordance with an aspect of the present invention, the multi-wavelength light is noise light.

In accordance with an aspect of the present invention, the multi-wavelength light adding unit is an operational amplifier, an input of which is not given, and the multi-wavelength light adjusting unit is a light attenuating unit for attenuating the output of the operational amplifier and changing an attenuating ratio in accordance with the waveform distortion.

In accordance with an aspect of the present invention, the waveform distortion is kept at minimum.

In accordance with an aspect of the present invention, the incident light supplying unit includes: a variable wavelength light source for generating light of a variable wavelength; a power supply of a modulating frequency use to modulate the variable wavelength light; and an optical modulating unit for modulating the variable wavelength light into the modulating frequency. The apparatus further includes: a photoelectric converting unit for photoelectrically converting the transmitted light a phase comparing unit for measuring a phase difference between an output of the photoelectric converting unit and an output of the power supply and a characteristic calculating unit for obtaining a group delay or a wavelength dispersion of the objective from the phase difference.

According to the present invention an optical characteristic measuring method for measuring a characteristic of a light transmitting objective includes: supplying an incident light to the objective; measuring a waveform distortion of the light transmitted from the objective; and adjusting an output of the incident light so that the waveform distortion measured in the waveform distortion measuring step falls within a predetermined range.

According to the present invention an optical characteristic measuring method for measuring a characteristic of a light transmitting objective includes: supplying incident light to the objective; measuring a waveform distortion of the light transmitted from the objective; adding multi-wavelength light having combined therein a plurality of wavelengths to the incident light; and adjusting an output of the multi-wavelength light so that the waveform distortion measured in the waveform distortion measuring step falls within a predetermined range.

According to the present invention a computer-readable medium having a program of instructions for execution by a computer to perform an optical characteristic measuring process for measuring a characteristic of a light transmitting objective is provided. The optical characteristic measuring process includes: supplying incident light to the objective; measuring a waveform distortion of the light transmitted from the objective; and adjusting an output of the incident light so that the waveform distortion measured in the waveform distortion measuring processing falls within a predetermined range.

According to the present invention, a computer-readable medium having a program of instructions for execution by a computer to perform an optical characteristic measuring process far measuring a characteristic of a light transmitting objective is provided. The optical characteristic measuring process includes: supplying incident light to the objective; measuring a waveform distortion of the light transmitted from the objective; adding multi-wavelength light having combined therein a plurality of wavelengths to the incident light; and adjusting an output of the multi-wavelength light so that the waveform distortion measured in the waveform distortion measuring processing falls within a predetermined range.

Figure 2:
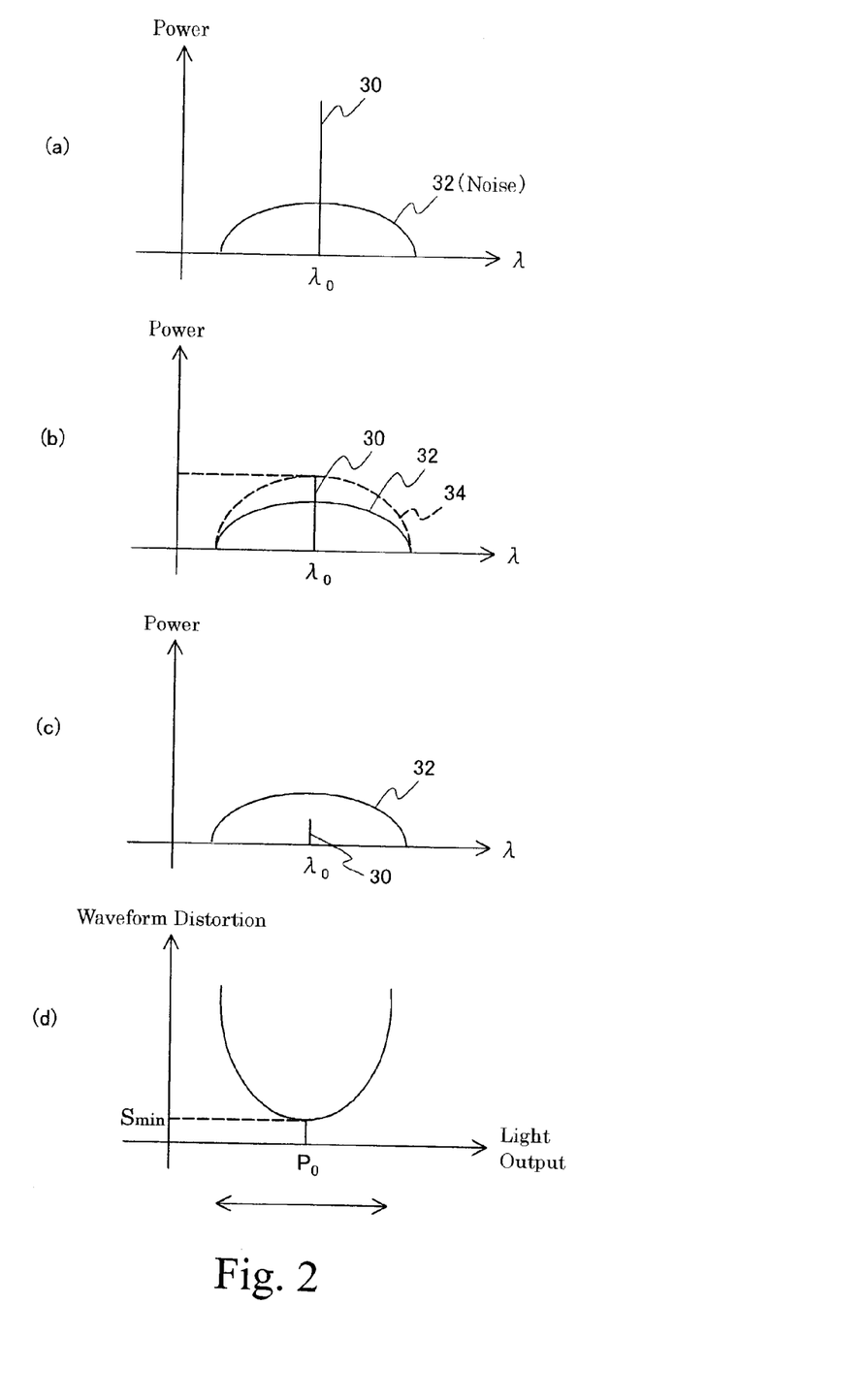
FIG. 2 shows principles for suppressing a waveform distortion of a transmitted light within a predetermined range.

Here, FIG. 2 (d) shows a relationship between the optical output and the waveform distortion. When the output power of the incident light 3 is set on P0, the waveform distortion becomes a minimum value Smin. The waveform distortion becomes large when the output power of the incident light 3 is either over or under the P0. Accordingly, if the optical output adjusting unit 44 adjusts the ouput of the incident light generated from the optical source system 10 and sets to P0, the waveform distortion can be reduced.

DESCRIPTION OF THE PREFERRED EMBODIMENTS

Hereinafter, the preferred embodiments of the present invention will be described referring to the attached drawings.

<The First Embodiment>

Figure 1:
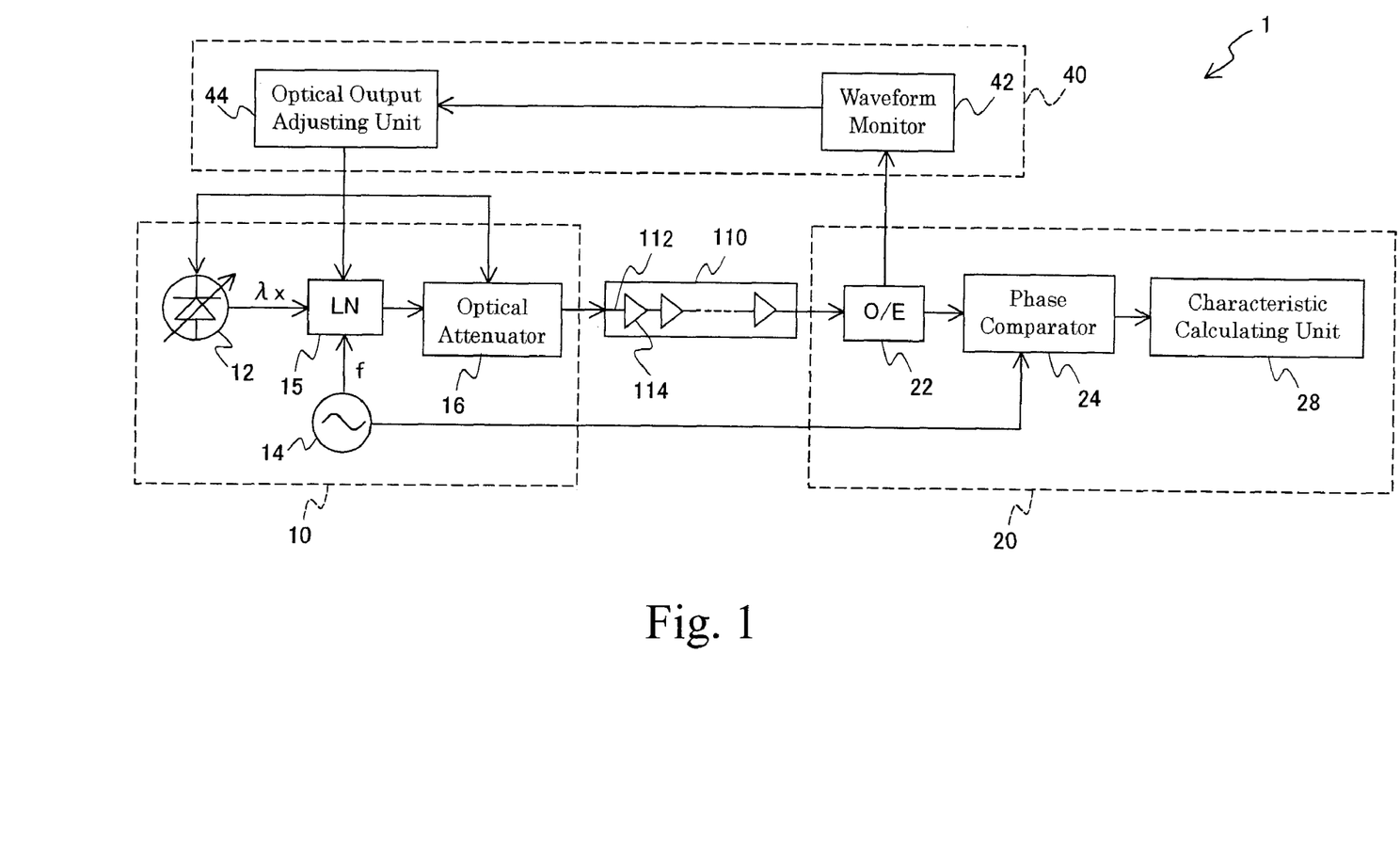
FIG. 1 is a block diagram showing a construction of an optical characteristic measuring apparatus according to the first embodiment of the invention.

FIG. 1 is a block diagram showing a construction of an optical characteristic measuring apparatus according to the first embodiment of the present invention. The optical characteristic measuring apparatus of the first embodiment has an optical source system 10 connected to an end of an optical fiber line 110, a characteristic measuring system 20 connected to the other end of the optical fiber line 110, and an optical output adjusting system 40 for adjusting an output of the optical source system 10 in accordance with a waveform distortion of a transmitted light.

The optical fiber line 110 has an optical fiber 112, and an optical amplifier 114 connected on the way of the optical fiber 112 and amplifying the light. The optical fiber line 110 passes light in the right direction.

The optical source system 10 comprises a variable wavelength light source 12, a power supply for modulation 14, an optical modulator 15, and an optical attenuator 16. The variable wavelength light source 12 generates a variable wavelength light which a waveform is varied. A wavelength λx of the variable wavelength light can be swept by the variable wavelength light source 12. The optical modulator 15 modulates the variable wavelength light to a frequency f. The optical modulator 15 has Lithium-Niopate (LN). However, the optical modulator does not need to have LN if it can modulate the light. The optical attenuator 16 attenuates the variable wavelength light and then supplies it to the optical fiber line 110.

An incident light supplied to the optical fiber line 110 transmits the optical fiber line 110. The light transmitting the optical fiber line 110 is referred to as a transmitted light.

The characteristic measuring system 20 includes a photoelectric converter 22, a phase comparator 24, and a characteristic calculating unit 28.

The photoelectric converter 22 converts the transmitted light into an electric signal. The phase comparator 24 measures a phase difference between an output of the photoelectric converter 22 and an output of the power supply for modulation 14. The characteristic calculating unit 28 calculates a group delay characteristic or a wavelength dispersion characteristic of the optical fiber line 110, on the basis of the phase measured from the phase comparator 24. The group delay characteristic can be calculated from a relationship between a phase measured from the phase comparator 24 and a modulated frequency f. The wavelength dispersion characteristic can be obtained by differentiating the group delay characteristic with the wavelength.

The optical output adjusting system 40 has a waveform monitor 42 and an optical output adjusting unit 44. The waveform monitor 42 measures a relationship between an output of the transmitted light and the waveform distortion of the transmitted light from the output of the photoelectric converter 22. The optical output adjusting unit 44 adjusts an output of the incident light generated from the optical source system 10, by controlling the optical source system 10. More particularly, it adjusts at least one factor in the variable wavelength light source 12, the optical modulator 15, or the optical attenuator 16.

Namely, the optical output adjusting unit 44 adjusts the output power of the variable wavelength light source 12. Or, it adjusts an amplitude of an output of the optical modulator 22. Or, it adjusts an attenuating ratio in the optical attenuator 16. By means of such adjustment, the optical output adjusting unit 44 enables the waveform distortion measured by the waveform monitor 42 to be placed within a predetermined range. It is preferable for the optical output adjusting unit 44 to minimize the waveform distortion (jitter) measured by the waveform monitor 42.

The optical output adjusting unit 44 adjusts the output of the incident light generated from the optical source system 10 and enables for the waveform distortion (jitter) of the transmitted light to be placed within a predetermined range. The principle will be described referring to FIG. 2. In addition, the waveform distortion (jitter) means a time jitter of a signal.

FIG. 2(a) shows the waveform of the incident light. The incident light 30 has wavelength λ0 which a range of waveform is narrower and power is greater than that of noise 32. If it is incident upon the optical fiber line 110 as it is, the waveform of the transmitted light is distorted. Thus, as shown in FIG. 2(b), it lowers an output power of the incident light 30 and a difference between the output power of the incident light 30 and an output power of the noise 32 is reduced. That is, it lowers a S/N ratio. Then, an imaginary incident light 34 is deemed to be incident upon the optical fiber line 110. Since the imaginary incident light 34 has a wide range of wavelength, the waveform distortion of the transmitted light is minimized. At this time, the output power of the incident light 30 is set on P0. That is, as shown in FIG. 2(c), when the output power of the incident light 30 is smaller than the P0, it is dominated by the noise 32 and thereby the waveform distortion of the transmitted light becomes large.

Here, FIG. 2(d) shows a relationship between the optical output and the waveform distortion. When the output power of the incident light 30 is set on P0, the waveform distortion becomes a minimum value Smin. The waveform distortion becomes large when the output power of the incident light 30 is either over or under the P0. Accordingly, if the optical output adjusting unit 34 adjusts the output of the incident light generated from the optical source system 10 and sets to P0, the waveform distortion can be reduced.

Figure 3:
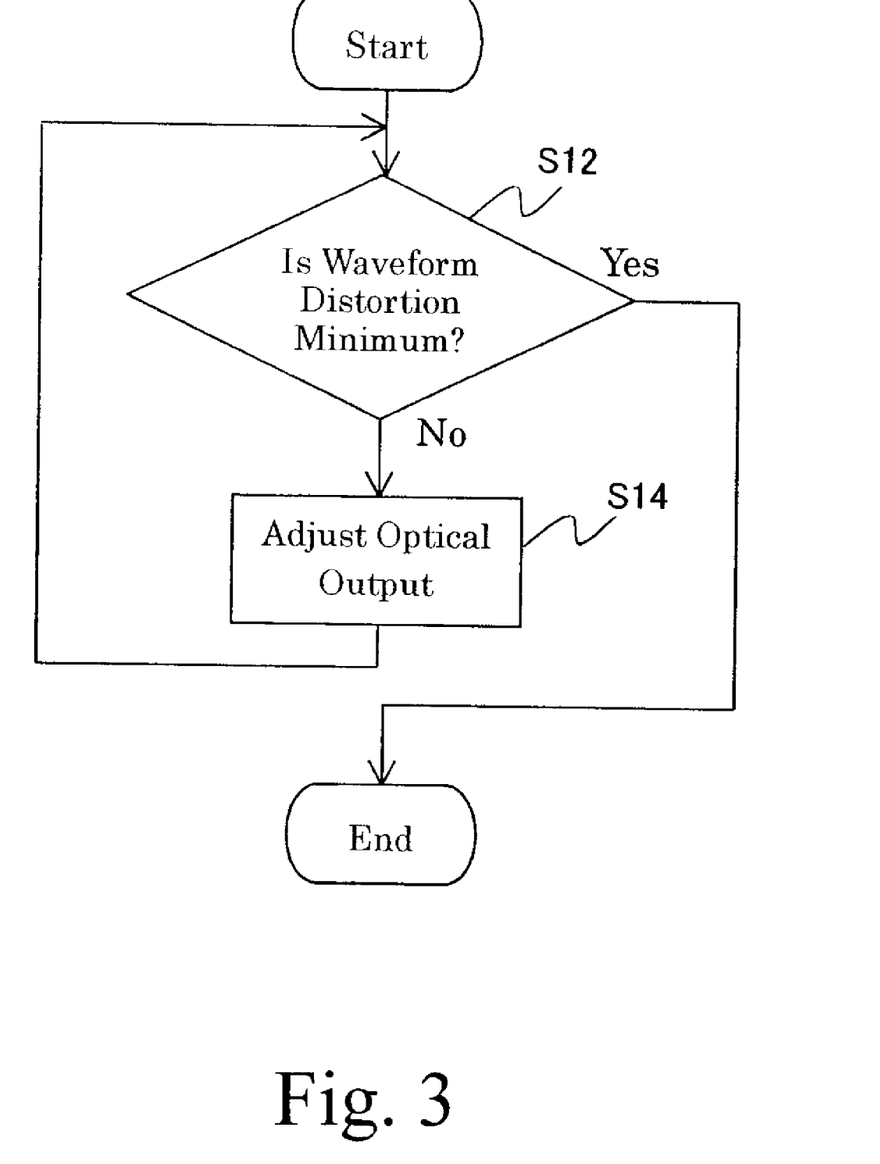
FIG. 3 is a flow chart showing an operation of the first embodiment of the invention.

Next, an operation of the first embodiment of the present invention will be explained referring to a flow chart in FIG. 3. First, the variable wavelength light source 12 generates light by changing a wavelength. The light is modulated into the frequency f of the power supply for modulation 14 through the optical modulator 15, and then is incident upon the optical fiber line 110. The light transmitting the optical fiber line 110 is converted into the electric signal by the photoelectric converter 22, and then a phase thereof is compared with that of the electric signal generated from the power supply for modulation 14 by the phase comparator 24. That is, a phase difference is calculated. The group delay or the wavelength dispersion of the optical fiber line 110 can be obtained by the characteristic calculating unit 28, using the phase difference value.

Here, the waveform monitor 42 measures a relationship between the output of the transmitted light and the waveform distortion of the transmitted light with reference to the output of the photoelectric converter 22. The optical output adjusting unit 44 measures whether the waveform distortion is the minimum or not (S12). It is practical to determine whether or not the waveform distortion is the minimum by recording the waveform distortion corresponding to an output power of the incident light. Or, it is practical to determine whether a value differentiated by the output power of the incident light is 0 or not. If the waveform distortion is not the minimum (S12, No), the output of the incident light is adjusted by the optical power adjusting unit (S14). And then, returns back to the determination (S12) for determining whether or not the waveform distortion is the minimum. By the contrary, if the waveform distortion reaches the minimum (S12, Yes), the optical output adjusting system 40 terminates the adjustment of the output of the incident light.

According to the first embodiment, even when the wavelength range of the incident light is narrow, by lowering the S/N ratio properly, the light having a wide wavelength range can be incident upon imaginarily and thereby a wavelength distortion of the transmitted light can be reduced.

<The Second Embodiment>

Figure 4:
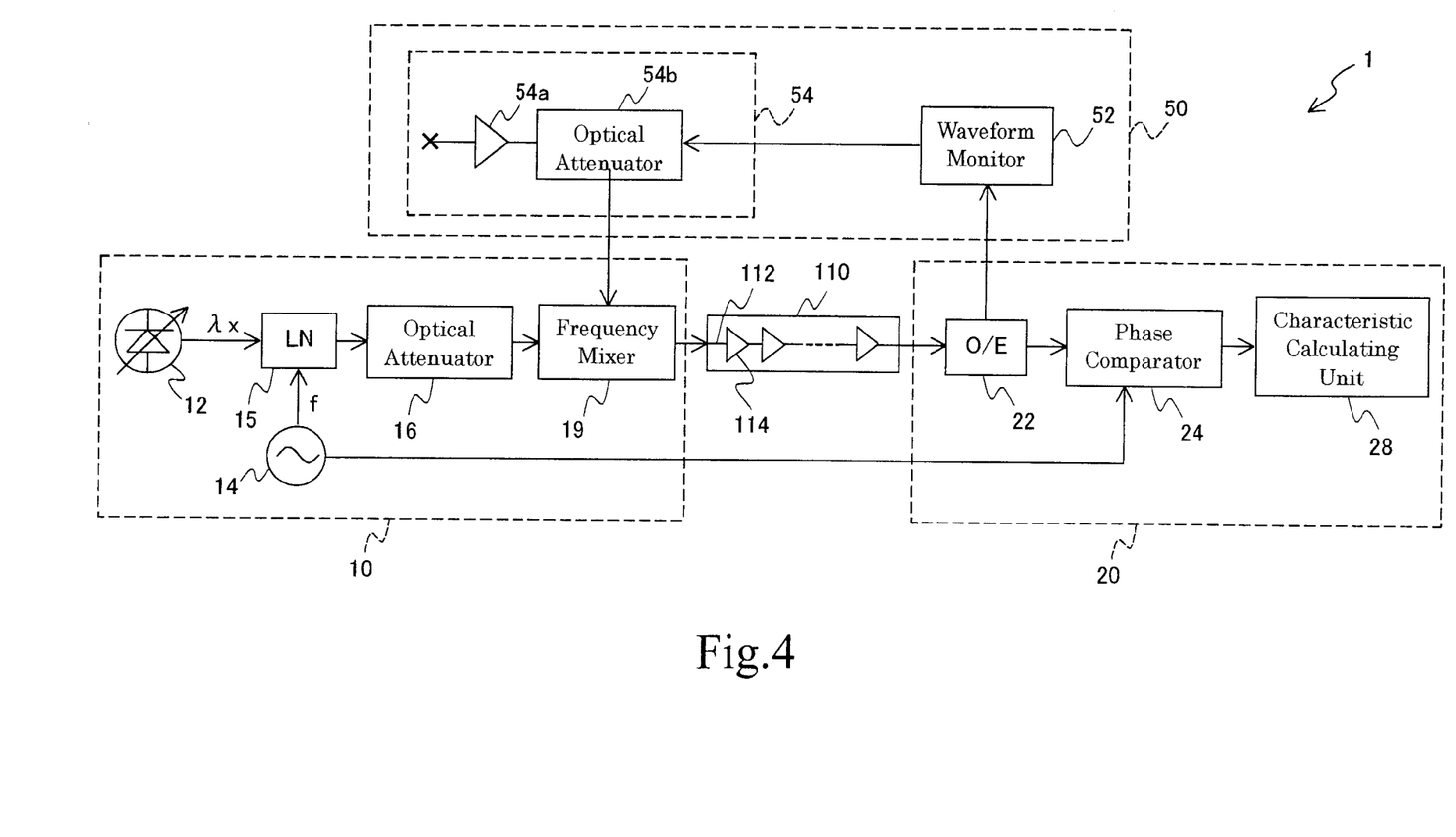
FIG. 4 is a block diagram showing a construction of an optical characteristic measuring apparatus according to the second embodiment of the invention.

An optical characteristic measuring apparatus according to the second embodiment is similar to that of the first embodiment, except that a multi-wavelength light adding system 50 which adds a multi-wavelength light having combined a plurality of wavelengths is provided for an incident light, instead of the optical output adjusting system 40 in the first embodiment.

FIG. 4 is a block diagram showing an outline of a construction of an optical characteristic measuring apparatus according to the second embodiment of the invention. The optical characteristic measuring apparatus of the second embodiment has an optical source system 10 connected to an end of an optical fiber line 110, a characteristic measuring system 20 connected to the other end of the optical fiber line 110, and a multi-wavelength light adding system 50 for adding the multi-wavelength light on the output from the optical source system 10 on the basis of the waveform distortion of the transmitted light. Hereinafter, a part identical to the first embodiment, the same numerical reference numeral will be given and the explanation thereof will be omitted.

The optical source system 10 comprises a variable wavelength light source 12, a power supply for modulation 14, an optical modulator 15, an optical attenuator 16 and a frequency mixer 19. The frequency mixer 19 adds an output from the multi-wavelength light adding system 50 to light outputted from the optical attenuator 16. An output from the frequency mixer 19 is supplied to the optical fiber line 110 as an incident light.

The incident light supplied to the optical fiber line 110 transmits the optical fiber line 110. The light transmitting the optical fiber line 110 is referred to as a transmitted light.

The characteristic measuring system 20 includes a photoelectric converter 22, a phase comparator 24, and a characteristic calculating unit 28. The construction of the characteristic measuring system 20 is identical to that of the first embodiment.

The multi-wavelength light adding system 50 has a waveform monitor 52 and a multi-wavelength light adjusting unit 54. The waveform monitor 52 measures a relationship between an output of the transmitted light and a waveform distortion of the transmitted light from an output of the photoelectric converter 22. The multi-wavelength light adjusting unit 54 generates a multi-wavelength light, adjusts an output power of the multi-wavelength light on the basis of the measuring result from the waveform monitor 52, and then supplies to the frequency mixer 19. In addition, the multi-wavelength light means a light having combined plurality of wavelengths. For example, the multi-wavelength light is a noise such as ASE (spontaneous emission light).

The multi-wavelength light adjusting unit 54 has an operational amplifier 54a and an optical attenuator 54b. An input is not given to the operational amplifier 54a. The light outputted from the operational amplifier 54a is a noise such as ASE (spontaneous emission light). The optical attenuator 54b attenuates the light outputted from the operational amplifier 54a in order to enter the waveform distortion of the transmitted light transmitting the optical fiber line 110 to a predetermined range. It is preferable for the optical attenuator 54b to set the waveform distortion at the minimum which the waveform monitor 52 has been measured.

The optical attenuator 54b attenuates the light outputted from the operational amplifier 54a, thus it enables the waveform distortion (jitter) of the transmitted light to be placed within a predetermined range. The principle will be described referring to FIG. 5. In addition, the waveform distortion means a time jitter of a signal.

Figure 5:
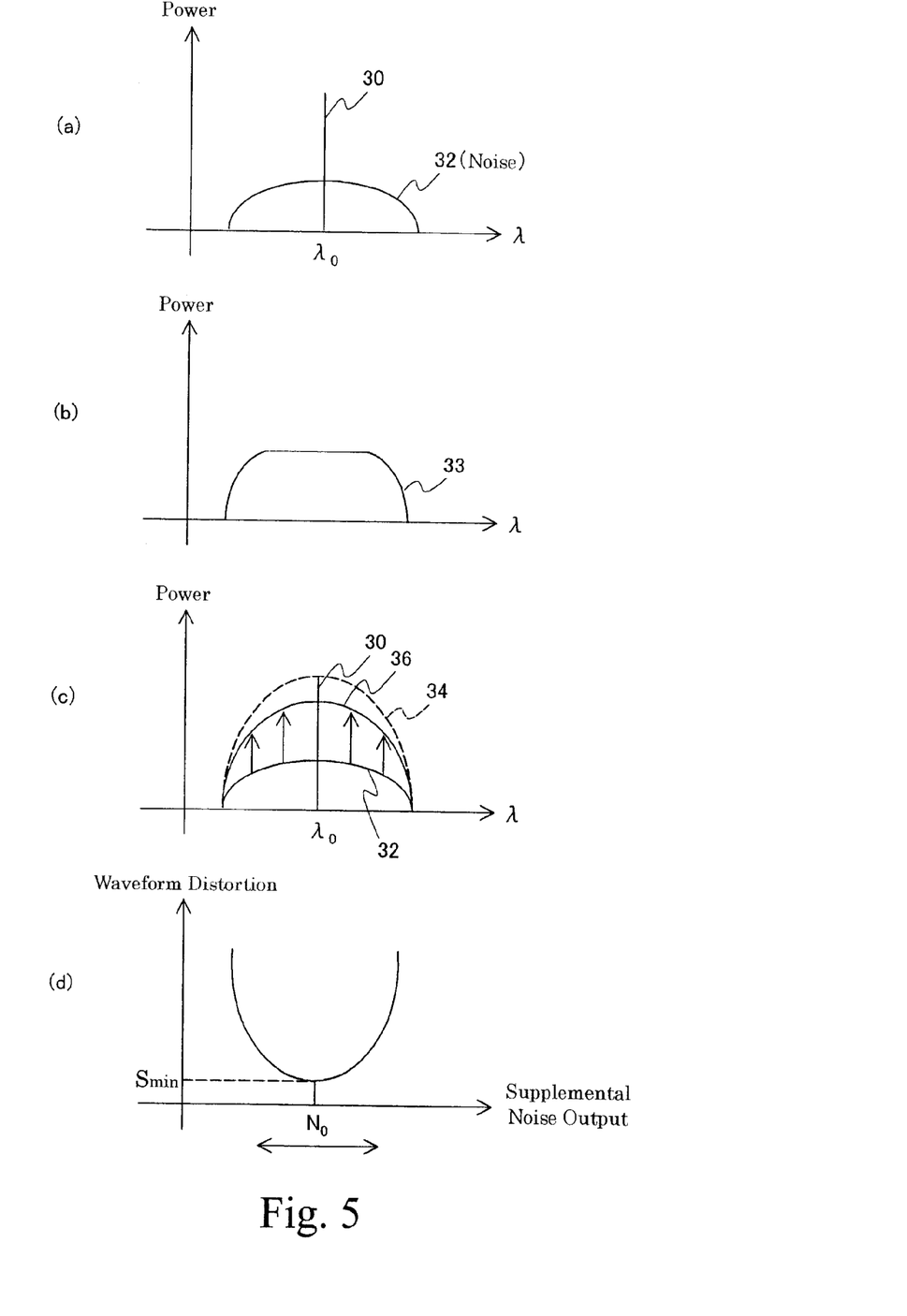
FIG. 5 shows principles for suppressing a waveform distortion of a transmitted light within a predetermined range.

FIG. 5(a) shows the waveform of the incident light. The incident light 30 has wavelength λ0 which a range of waveform is narrower and power is greater than that of a noise 32. If it is incident upon the optical fiber line 110, the waveform of the transmitted light is distorted. Thus, as shown in FIG. 5(b), a supplemental noise 33 produced by attenuating the light outputted from the operational amplifier 54a properly by the optical attenuator 54b is added to the incident light and lowers the S/N ratio. Then, as shown in FIG. 5(c), the supplemental noise 33 is added to the noise 32 and this noise is referred to as an imaginary noise 36. Accordingly, an imaginary incident light 34 is deemed to be incident upon the optical fiber line 110. Since the imaginary incident light 34 has a wide range of wavelength, the waveform distortion of the transmitted light is minimized. At this time, the output power of the supplemental noise is set on N0. In addition, when the supplemental noise is too large, over N0, the incident light 30 is dominated by the imaginary noise 36 and thereby the waveform distortion of the transmitted light becomes large.

Here, FIG. 5(d) shows a relationship between the optical output and the waveform distortion. When the output power of the supplemental noise 33 is set on N0, the waveform distortion becomes a minimum value Smin. The waveform distortion becomes large when the output power of the supplemental noise 33 is either over or under the N0. Accordingly, if the optical attenuator 54b attenuates the light outputted from the operational amplifier 54a and sets the output power to N0, the waveform distortion can be reduced.

Figure 6:
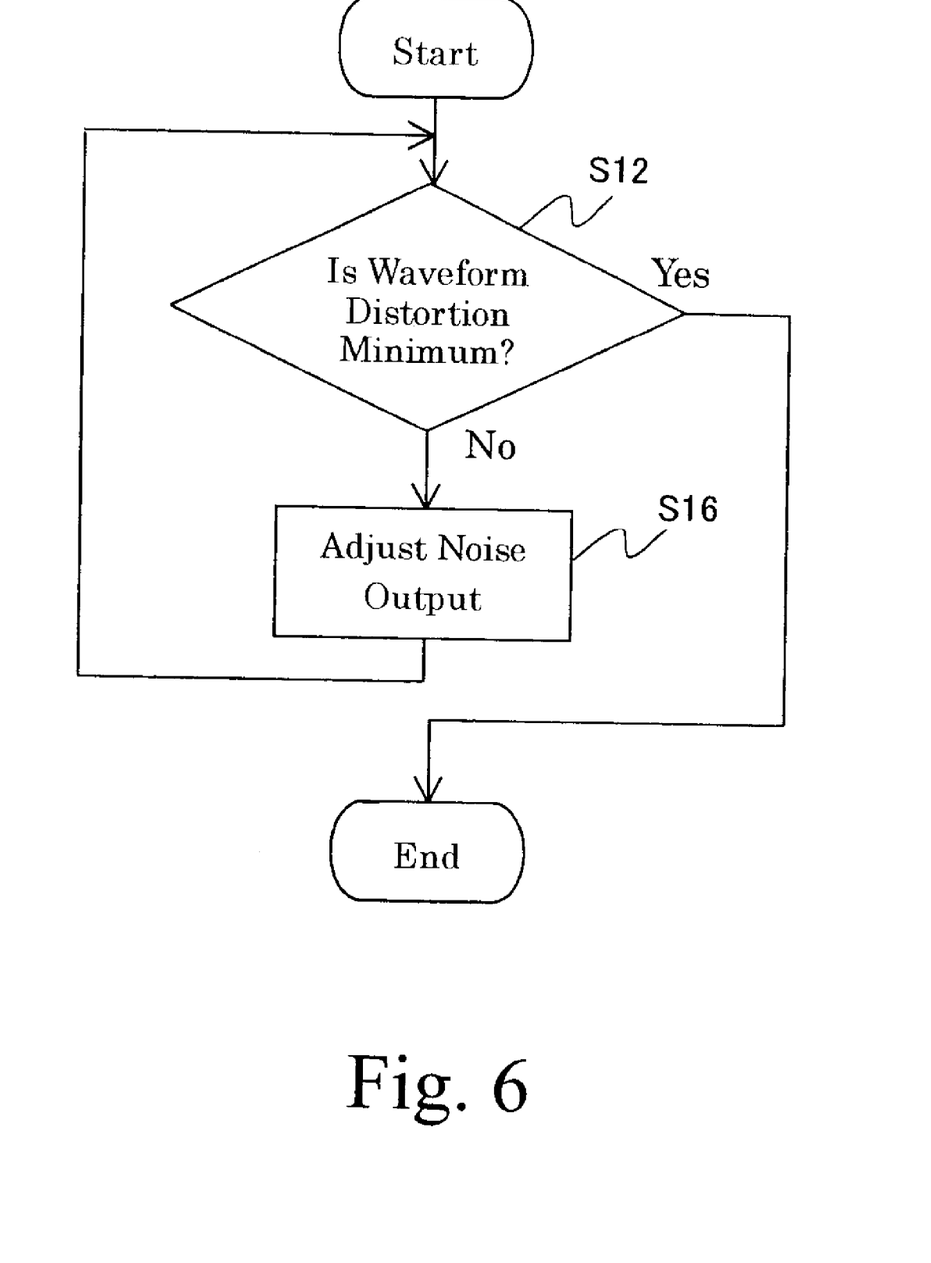
FIG. 6 is a flow chart showing an operation of the second embodiment of the invention.

Next, an operation of the second embodiment of the present invention will be explained referring to a flow chart in FIG. 6. First, the variable wavelength light source 12 generates light by changing a wavelength. The light is modulated into the frequency f of the power supply for modulation 14 through the optical modulator 15, and then is incident upon the optical fiber line 110. The light transmitting the optical fiber line 110 is converted into an electric signal by the photoelectric converter 22, and then a phase thereof is compared with that of the electric signal generated from the power supply for modulation 14 by the phase comparator 24. That is, a phase difference is calculated. The group delay or the wavelength dispersion of the optical fiber line 110 can be obtained by the characteristic calculating unit 28, using the phase difference value.

Here, the waveform monitor 52 measures a relationship between the output of the transmitted light and the waveform distortion of the transmitted light with reference to the output of the photoelectric converter 22. The multi-wavelength light adjusting unit 54 measures whether the waveform distortion is the minimum or not (S12). It is practical to determine whether or not the waveform distortion is the minimum by recording the waveform distortion corresponding to an output power of the supplemental noise. or it is practical to determine whether a value differentiated by the output power of the supplemental noise is 0 or not. If waveform distortion is not the minimum (S12, No), the output of the supplemental noise is adjusted by the multi-wavelength light adjusting unit 54 (S14). And then, the process returns back to the determination (S12) for determining whether or not the waveform distortion is the minimum. By the contrary, if the waveform distortion reaches the minimum (S12, Yes), the multi-wavelength light adjusting unit 54 terminates the adjustment of the output of the supplemental noise.

According to the second embodiment, even when the wavelength range of the incident light is narrow, by adding the supplemental noise and lowering the S/N ratio, the light having wide wavelength range can be incident upon imaginarily and thereby the wavelength distortion of the transmitted light can be reduced.

Also, the above embodiments according to the invention are executed as follow. In a media reading device of computer comprising a CPU, a hard disk, media (floppy disk, CD-ROM, etc) reading device, it is read the media recording a program embodying each component of the above-mentioned, and is installed to the hard disk. By the above method, the above function can be executed.

According to the present invention, by adjusting the output of the incident light or adding the multi-wavelength light such as noise and like to the incident light, a ratio of incident light and noise, that is, a S/N ratio (signal to noise ratio) is lowered. The noise is existed within a range of wide wavelength relatively. Accordingly, if the S/N ratio is lowered properly, the incident light of which the wavelength is in the wide range can be supplied to the objective. Therefore, it is possible to reduce the waveform distortion of an outgoing light.

What is claimed is:

1. An optical characteristic measuring apparatus for measuring a characteristic of a light transmitting objective, said apparatus comprising:

an incident light supplying element for supplying incident light to said objective;

a waveform distortion measuring element for measuring a waveform distortion degree of the light transmitted from said objective; and an optical output adjusting element for adjusting an output of the incident light prior to supplying the incident light to the objective so that
   (i) the output of the incident light, after being adjusted by the optical output adjusting element, has a range of wavelengths wider than that of the input of the incident light which has not been adjusted by the optical output adjusting element yet, and wider than that of the output of the incident light if assuming that the incident light is directly supplied to the objective without being adjusted by the optical output adjusting element, and
   (ii) said waveform distortion degree measured by said waveform distortion measuring element falls within a predetermined range.

2. An optical characteristic measuring apparatus according to claim 1, wherein said predetermined range is a range in which said measured waveform distortion degree is minimum.

3. An optical characteristic measuring apparatus according to claim 1, wherein said incident light supplying element comprises:

a variable wavelength light source for generating variable wavelength light;

a power supply of a modulating frequency, which is used to modulate the variable wavelength light; and an optical modulator for modulating said variable wavelength light into said modulating frequency;

said apparatus further comprising:
   a photoelectric converting element for photoelectrically converting said transmitted light;
   a phase comparing element for measuring a phase difference between an output of said photoelectric converting element and an output of said power supply; and
   a characteristic calculating element for determining a group delay or a wavelength dispersion of said objective from said phase difference.

4. The apparatus of claim 1, wherein said optical output adjusting element lowers a signal-to-noise ratio of the incident light.

5. The apparatus of claim 4, wherein said optical output adjusting element lowers a power level of the incident light.

6. An optical characteristic measuring method for measuring a characteristic of a light transmitting objective, said method comprising the steps of:

supplying incident light to said objective;

measuring a waveform distortion degree of the light transmitted from said objective; and adjusting an output of the incident light so that (i) a range of wavelengths of the incident light becomes wider , and (ii) said waveform distortion degree measured in said measuring step falls within a predetermined range.

7. The method of claim 6, wherein said adjusting step comprises lowering a power level of the incident light.

8. A computer-readable medium having a program of instructions for execution by a computer to perform an optical characteristic measuring process for measuring a characteristic of a light transmitting objective, said optical characteristic measuring process comprising:

supplying incident light to said objective;

measuring a waveform distortion degree of the light transmitted from said objective; and adjusting an output of the incident light so that (i) a range of wavelengths of the incident light becomes wider , and (ii) said waveform distortion degree measured in said measuring step falls within a predetermined range.

9. The computer-readable medium of claim 8, wherein said adjusting processing comprises lowering a power level of the incident light.

* * * * *